United States Patent

[11] 3,627,601

| [72] | Inventors | Charles M. Hayes<br>Hoffman Estates;<br>Edwin J. Latos, Chicago; Allen K. Sparks,<br>Des Plaines, all of Ill. |
|---|---|---|
| [21] | Appl. No. | 845,685 |
| [22] | Filed | July 29, 1969 |
| [45] | Patented | Dec. 14, 1971 |
| [73] | Assignee | Universal Oil Products Company<br>Des Plaines, Ill. |

[54] METHOD OF FORMING A FILAMENT WOUND TUBE WITH AN INNER WALL HAVING HIGH-WEAR RESISTANCE
4 Claims, 2 Drawing Figs.

| [52] | U.S. Cl. | 156/73, 156/446 |
|---|---|---|
| [51] | Int. Cl. | B29c 27/08 |
| [50] | Field of Search | 156/73, 446, 444 |

[56] References Cited
UNITED STATES PATENTS

| 2,887,721 | 5/1959 | Blanchi et al. | 156/73 X |
|---|---|---|---|
| 3,003,304 | 10/1961 | Rasmussen | 156/73 X |
| 3,022,802 | 2/1962 | Lewis | 156/73 X |
| 3,499,815 | 3/1970 | Hof | 156/446 X |

*Primary Examiner*—Samuel Feinberg
*Assistant Examiner*—J. J. Devitt
*Attorneys*—James R. Hoatson, Jr. and Philip T. Liggett ABSTRACT: A method of forming a tube with an inner wall having a high-wear resistance and a low coefficient of friction comprising: deaerating an uncured thermosetting resin, coating glass filaments with the resin, and winding the glass filaments about a rotating mandrel in a band at a pitch no greater than the bandwidth. A first layer of wound glass filaments is formed in a single axial pass along the mandrel, and this first layer is helically overwound with subsequent layers. The resin coating the wound glass filaments is thereafter cured and the resulting tube is removed from the mandrel.

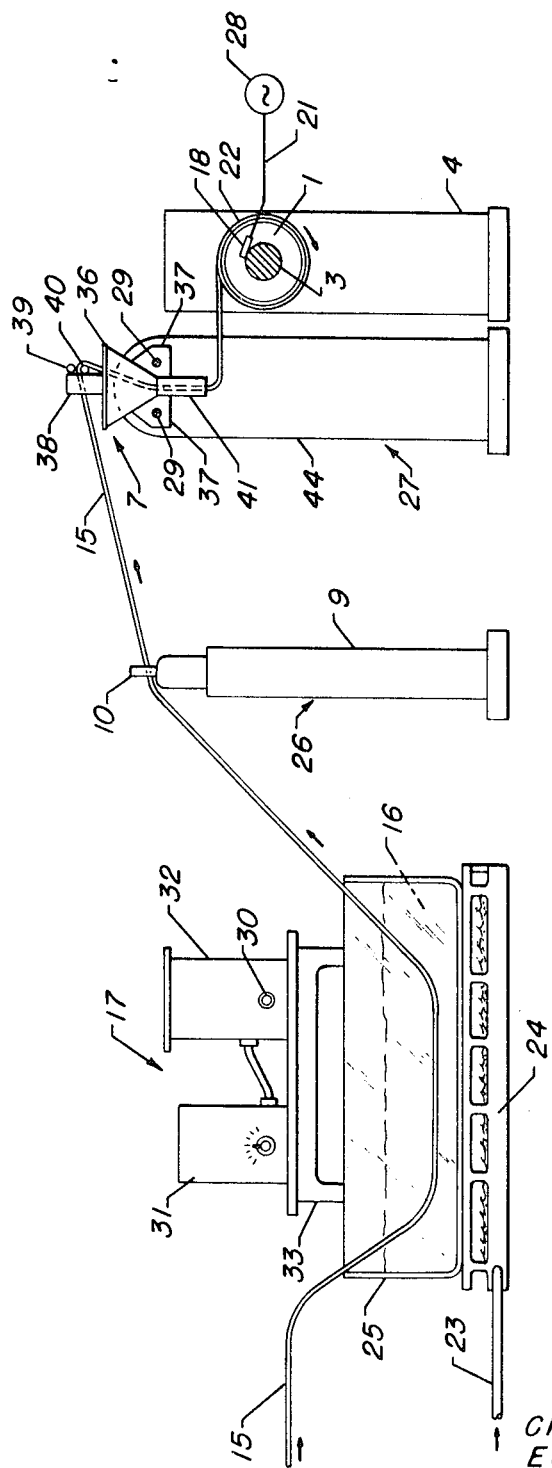

3,627,601

METHOD OF FORMING A FILAMENT WOUND TUBE WITH AN INNER WALL HAVING HIGH-WEAR RESISTANCE

This invention relates to a method of forming a tube with an inner wall having high-wear resistance and a low coefficient of friction. More particularly, the method involves deaerating an uncured thermosetting resin, coating glass filaments with the resin and winding the glass filaments about a rotating mandrel in a band at a pitch no greater than the bandwidth. A first layer of wound glass filaments is formed in a single axial pass along the mandrel, and this first layer is helically overwound with subsequent layers. The resin coating the wound fiberglass is thereafter cured and the resulting tube is removed from the mandrel.

Currently, there is a market for strong tubes having smooth inner surfaces. Such tubes can be used in a number of applications, as a hollow cylinder in which high pressure exists within the tube and a moving piston reciprocates in the tube. Pneumatic and hydraulic pumps in any phase of industry are prime examples of such applications. In the manufacture of a tube to be used as cylinder for a piston, there are several desirable and essential features to consider. The tube must be radially strong to resist large internal pressures, and axial strength of the tube is often required where the tube serves as a structural element as well as a cylinder. A smooth inner surface having high-wear resistance is essential, both so that the reciprocating piston may form a seal against the inner wall of the tube and so that an inordinate amount of heat will not be generated by the friction of the piston against the cylinder wall. Steel cylinders are the most common of the cylinders for pumps currently in use. Steel is naturally strong, and friction is controlled in steel cylinders by machine finishing or by providing the inner wall of the steel cylinder with a liquid or dry lubricant. Steel cylinders have the disadvantage of great weight, however, and finishing operations subsequent to the manufacture of steel tubes are laborious and expensive. In addition, the surfaces of a steel tube are subject to corrosion from materials that do not effect plastics or reinforced plastics. Furthermore, liquid lubricants used with the steel cylinder accumulate dirt rapidly and must frequently be replaced or replenished. Also, the use of dry lubricants on a steel surface is far from satisfactory since the incorporation of dry lubricants, such as molybdenum disulfide or graphite, into the steel surface may be accomplished only with great difficulty and expense.

Resin impregnated glass filaments are more suitable than steel for use as pump cylinders. Filament wound tubes are naturally strong and corrosion resistant, and a high-wear resistance and a low coefficient of friction may be obtained in a fiberglass wound tube by sanding or otherwise finishing the walls of the tube with an abrasive in order to produce a smooth surface. An extra hand or machine operation of extended duration is required to produce the desired result, however, and this adds considerably to the cost of the tube produced. In an alternative approach to increasing wear resistance within the tube, particles of a dry lubricant, such as molybdenum disulfide or graphite, are either suspended in the resin used to coat and bond the glass filaments forming the tube, or are incorporated into an inner layer of resin which serves as a liner for the tube. Particles of dry lubricant in the tube wall reduce the coefficient of friction and increase the wear resistance at the surfaces of the tube and may replace or supplement an abrasive finishing operation. The incorporation of dry lubricants into a filament wound tube has been used with some success, but without completely satisfactory results because the inclusion of a dry lubricant does nothing to improve the uneven surface which results from craters or pits formed by the existence of gas bubbles at the surface of the resin during curing.

Several other largely unsatisfactory methods of producing high-wear resistant—low friction surfaces on filament wound tubes have been attempted. Tubes have been produced having a smooth plastic film bonded to the surface of the tube. Also, filament wound tubes having oversized inner diameters have been produced and a resin which cures to a more friction free plastic surface, has been poured down or drawn into the space between the inner wall of the filament wound tube and a core of smaller diameter. The core is removed after curing of the coating of resin. A lack of satisfactory bonding between the different materials involved, and the extra steps in production made necessary by these methods have largely negated any benefits to be gained from filament wound tubes so produced. Furthermore, the direct finishing or sanding or grinding of the inner surface of the filament wound tube entails several problems. One problem is that any extensive sanding or grinding of the inner surface of a filament wound tube will expose and abrade the glass filaments used to form the tube, or will so nearly expose these glass filaments that moderate usage of the cylinder with a piston will work through the thin layer of resin remaining and will thereafter abrade the glass filaments. When abrasion occurs the useful life of the cylinder is ended.

Conventional filament wound tubes are currently produced with crossover filament windings at the inner surfaces of the tubes. That is, the helical pitch of filament winding is greater than the width of the filament or band of filaments being wound so that an inner layer of glass filaments contracting the mandrel upon which the tube is formed is not produced before at least two, and possibly three or more axial passes of the filament distributing arm along the length of the mandrel. The use of crossover winding results in a pitted interior surface on the tube produced because resin does not completely fill the gaps at the inner surface of the tube at crossover locations.

It is an object of the present invention to produce a filament wound tube having a smooth inner surface and having high-wear resistance and a small coefficient of friction at the inner surface by eliminating air pockets trapped between a mandrel and the glass filaments at the inner surface of the tube. This is accomplished by deaeration of the resin prior to curing and by the elimination of crossover winding at the inner surface of the tube.

It is a further object to produce an axially strengthened filament wound tube by using a deaerated resin so that voids or air bubbles are not trapped in the interior of the wall of a filament wound tube.

Another object is to produce a filament wound tube in which the resin bonds between filaments are stronger by virtue of a more complete wetting of the glass filaments due to the deaeration of the resin used to coat the glass filaments. This feature will strengthen a tube to resist better all forces acting on the tube, particularly those forces acting transverse to the longitudinal direction of the filament fibers. This is particularly important where the tube is to be used as a structural member as well as a cylinder.

Another object of this invention is to construct a filament wound tube in which particles of a dry lubricant are easily incorporated into the uncured resin prior to filament winding, but without the inclusion in the filament wound tube of the bubbles of air necessarily introduced into the uncured resin by mixing these particles into the resin. This is accomplished by deaerating the resin subsequent to the inclusion of the particles of dry lubricant into the resin.

In a broad aspect this invention is a method of forming a tube with an inner wall having high-wear resistance comprising the steps of: deaerating an uncured thermosetting plastic resin; coating glass filaments with said plastic resin; winding said glass filaments in a band at a pitch no greater than the bandwidth into a first layer about a rotating mandrel in a single axial pass along said mandrel; helically overwinding said glass filaments about said first layer in subsequent layers; curing said layers of said resin coated glass filaments to form a solid tube; and removing said tube from said mandrel.

This method works particularly well where the resin used is a resin of low viscosity. Such a resin more thoroughly wets the glass filaments as they pass through the resin. In addition, a resin of low viscosity has less of a tendency to entrap air in the resin while the glass filaments are being coated. In the normal process of filament winding, glass filaments are drawn from a spool or other source into a resin bath. A very viscous resin will part to allow the glass filament to enter and will thereafter close over the glass filament to enter and will thereafter close over the glass filaments as they are drawn further into the resin bath. This causes air to be entrapped in the resin on the surface of the glass filaments, which is where it is most inhibitive to good bonding. A more viscous resin, however, will not exhibit the surface tension heretofore described and will wet the glass filaments immediately as they enter the resin bath. The viscosity of the resin may not be decreased too drastically, however, or the fiberglass filaments will be forced to the inner surface of the tube during winding and will be subject to abrasion in the completed tube. For this reason, deaeration of the resin is necessary to this invention.

It has been found that one resin which is of sufficiently low viscosity at room temperature is a resin comprised of a polyester resin and a styrene cross-linking agent. This resin when placed in a bath, will reduce the number of air pockets initially entrapped in the resin.

Any conventional epoxy or polyester resin system may be used to coat the glass filaments in carrying out the steps of this invention, but resins having higher viscosity at room temperature must undergo a decrease in viscosity before a satisfactory filament wound tube may be produced. This is because that although deaeration effectively eliminates air initially entrapped in the resin, viscous resin will allow more air to become entrapped during winding. The simplest method of lowering the viscosity of a resin having a high viscosity at room temperature is to heat the resin. Since viscosity decreases geometrically upon being heated a satisfactory decrease in viscosity will occur in most polyester and epoxy resins if the uncured resin is maintained at a temperature of at least 35° C. prior to winding. To maintain the low viscosity achieved in these instances, it is often desirable for the mandrel to be maintained at a temperature of at least 35° C. during winding. Heating the mandrel will assist in alleviating the problems of air entrapment and void formation at the mandrel surface. A sophisticated method of heating the mandrel is by electrical resistance heating from the interior of the mandrel, though exterior heating and other forms of interior heating are quite satisfactory. The advantage of resistance heating from the interior of the mandrel is that a uniform temperature is more easily maintained at the mandrel surface. The resin is normally maintained at an elevated temperature prior to winding by heating the resin bath from beneath with catalytic burners, electrical resistance heaters, gas flames, or any other conventional heating means.

An additional improvement in the basic invention is to limit the speed of filament winding. Limiting the winding of glass filaments to a speed of less than about 3 linear inches per second is frequently beneficial for several reasons. First of all, as previously discussed, surface tension in the resin which results from high viscosity will cause the resin to part and allow glass filaments to enter a container in order to be coated. Thereafter the resin will close in on the glass filaments thereby entrapping air against the glass filaments. Heating the resin will alleviate this problem to a large extent, but it is often quite helpful to lower the speed of the glass filaments entering the resin vat so as to further reduce this air entrapment. Similarly, as the filaments are wound onto the mandrel, a slower speed will allow the resin on the filaments to drain onto the mandrel so that air is not trapped beneath the glass filaments at the surface of the mandrel as so often occurs at high-filament winding speeds.

In the preferred practice of the method of this invention, deaeration is effected by applying ultrasonic vibrations of at least 20,000 cycles per second to the resin prior to filament winding. This is normally done in the resin container or in a separate vat of an ultrasonic generator as the resin is at rest prior to coating the fiberglass filaments. The high-frequency vibrations transmitted directly to the resin in the ultrasonic generator cause gas bubbles and air bubbles entrapped in the resin to rise to the surface thereof and be dissipated into the atmosphere. The use of ultrasonic vibrations to deaerate the resin is effective, swift, cheap, and does not interfere with the other steps of filament winding the tube as described.

The preferred manner of implementation of this invention is more fully illustrated in the accompanying drawings.

FIG. 2 is a side view taken along the line 2—2 of FIG. 1.

Figure 1:
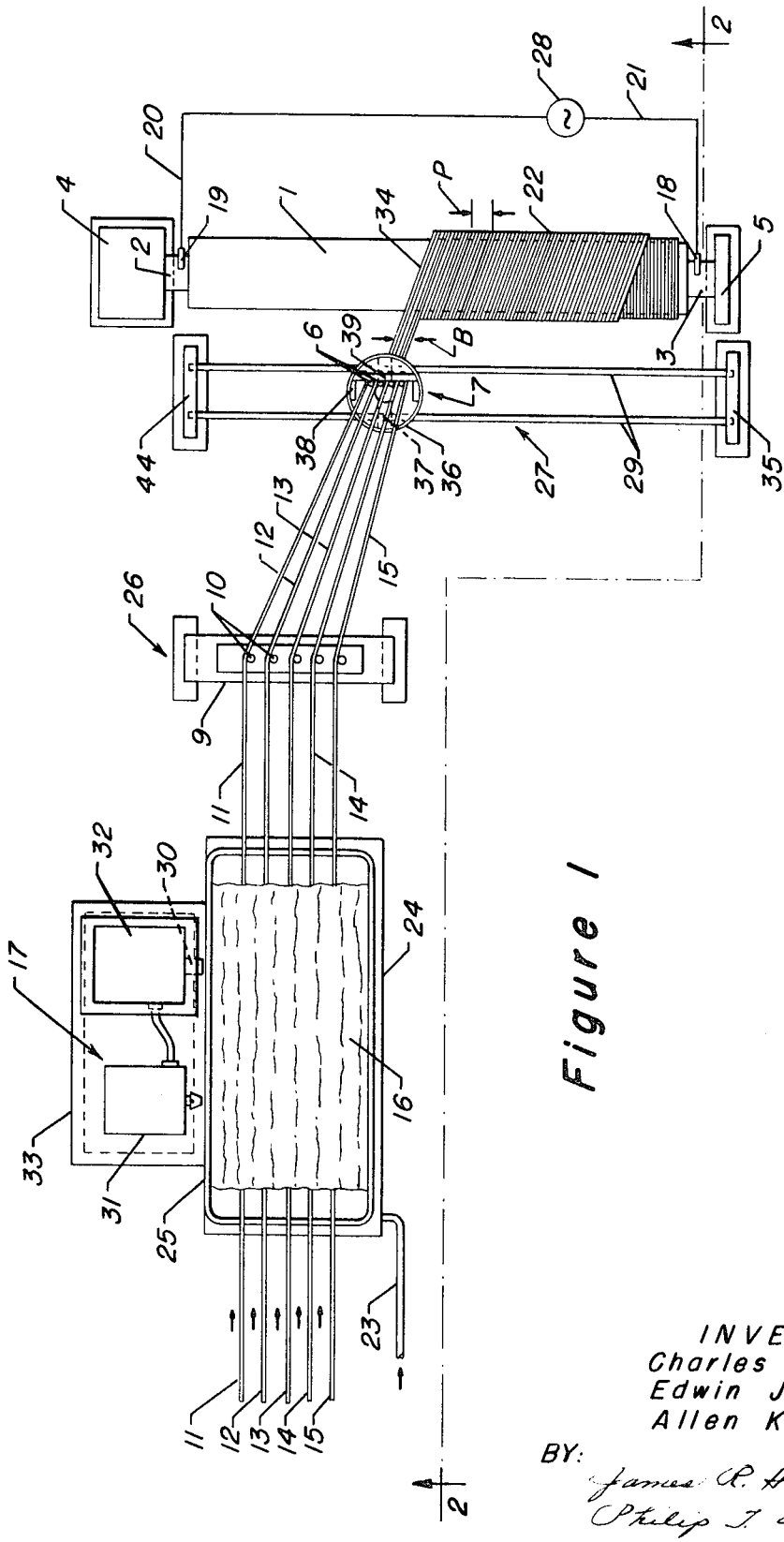
FIG. 1 is a plan view of the apparatus used for implementation of the method of this invention illustrated at an intermediate stage of formation of a filament wound tube.

Referring now to the drawings there is shown a mandrel 1 4 inches in diameter mounted between two mandrel holders 4 and 5 by means of rotatable axles 2 and 3. The container 25, which for the purposes of illustration may be considered to have transparent walls, contains a quantity of uncured thermosetting plastic resin 16 containing a quantity of molybdenum disulfide particles. The container 25 and the quantity of resin therein are commonly termed a resin bath. Between the mandrel and the resin bath are positioned a guide assembly 26, and a filament distributing assembly 27. Guide assembly 26 is comprised of a base 9 upon which are mounted upright fingers 10. The fingers 10 may be equally or unequally spaced along base 9, but in any event are aligned in a straight line transverse to the direction of glass filament travel through the resin bath. The filament distributing assembly 27 is comprised of end posts 44 and 35 with two longitudinal rails or guides 29 therebetween. A distributing arm 7, shaped roughly in the form of a funnel moves parallel to the axis of mandrel 1 along rails 29. Distributing arm 7 is comprised of an upper inverted conical section 36 from which a spout 41 having an oblong cross section projects downward. Flanges 37 extend from either side of conical section 36, and rails 29 pass through these flanges, thereby limiting the direction of travel of distributing arm 7. An upper horizontal bar 39 and a lower horizontal bar 40 are fastened between upright extensions 38 on either side of conical section 36. A series of vertical guide fingers 6 are fastened to the sides of bars 39 and 40 furthest from mandrel 1. Guide fingers 6 are more closely spaced than are guide fingers 10. As the glass filaments are being wound, they pass between guide fingers 6, over bar 40, and down through the funnel and out of spout 41 in a substantially flat band to be wound on mandrel 1.

An ultrasonic generator 17 is located above and to the rear of container 25 on a table 33. Ultrasonic generator 17 is comprised of a transducer unit 31 which controls the electrical signals used, and a tank unit 32 within which uncured thermosetting plastic resin and particles of molybdenum disulfide are mixed. Ultrasonic generator 17 generates vibrations of 38,000 cycles per second. These vibrations are transmitted to the resin in the tank unit 32. Entrapped air and other gas bubbles within the resin mixture are driven off and the resin mixture is thereby deaerated. The resin and the particles of molybdenum disulfide are then drained into container 25 by means of spigot 30. As the glass filaments 11, 12, 13, 14, and 15 are coated with the resin and entrained particles of molybdenum disulfide in container 25, the resin mixture in container 25 is replenished from new batches of deaerated resin subjected to ultrasonic vibrations in ultrasonic generator 17 and drained into container 25.

Container 25 rests upon a gas burner 24, which maintains the resin mixture 16 at a temperature of 50° C. to deaerate the resin during filament winding. An inlet tube 23 pipes gaseous fuel to burner 24. Normally either ultrasonic generator 17 or gas burner 24, but not both would be used to deaerate the resin 16. Both have been depicted for the sake of illustrating the apparatus involved.

The axles 2 and 3 upon mandrel 1 is mounted lead to internal resistance heating coils within mandrel 1. Electrical bushes 18 and 19 are positioned against axles 3 and 2 respectively, and an electrical line 20 leads from brush 19 and an electrical line 21 leads from brush 18 to an alternating current source 28. The current passes from current source 28 to axles 2 and 3 of mandrel 1 and to the internal resistance coils within mandrel 1 in order to heat the surface of mandrel 1 to a temperature of 50° C.

A filament wound tube is formed from the apparatus described by drawing glass filaments 11, 12, 13, 14 and 15 through resin 16 at an approximate speed of 2 inches per second. Glass filaments 11, 12, 13, 14 and 15 emerge from the resin bath and pass between the upright posts 10 of guide assembly 26. The glass filaments thereafter pass between the upright fingers 6, a crossbar 40, down into conical section 36, and out of spout 41 of distributing arm 7 where they are formed into a flat band 34. Mandrel 1 is rotated clockwise (as viewed in FIG. 2) at an angular velocity of slightly less than 57.3° per second, depending upon the winding pitch and band width used. Since the mandrel diameter is 4 inches, the band 34 of glass filaments will be drawn onto mandrel 1 at a rate of approximately 2 inches per second. Band 34 is first wound circumferentially about mandrel 1 at the end of mandrel 1 adjacent to axle 3. Thereafter, distributing arm 7 begins moving axially along rails 29 at a speed dependent upon the width of the band formed by glass filaments 11, 12, 13, 14 and 15, and the winding pitch. During the time it takes for one revolution of the mandrel 1, distributing arm 7 moves parallel to the axis of mandrel 1 a distance equal to the pitch at which the band of glass filaments is wound. As distributing arm 7 moves along the rails 29 it can be seen that a first layer 22 of resin impregnated glass filaments is formed about mandrel 1 from the adjacent loops of band 34 which are wound at a pitch P which is slightly less than bandwidth B of band 34. Ideally, the adjacent loops of band 34 would neither overlap nor would there be interstitial gaps between adjacent loops of band 34. In such a case mandrel 1 would be covered by a continuous laminar layer of glass filaments at the end of a single pass of distributing arm 7 along the length of mandrel 1. As a practical matter, however, it is very difficult to get each loop to meet each adjacent loop exactly without leaving interstitial spaces between adjacent loops. Such spaces are to be avoided at all costs, so each successive loop of the band of glass filaments slightly overlaps the previous loop. The pitch P of winding of the band 34 of the glass filaments is therefore slightly less than the bandwidth B, as is indicated in FIG. 1.

In the process of filament winding, fuel is introduced through fuel inlet 23 into burner 24. Burner 24 raises container 25 to a temperature of 60° C. Particles of molybdenum disulfide are mixed into a quantity of uncured thermosetting plastic resin in the tank unit 32 of ultrasonic generator 17. Ultrasonic generator 17 is turned on and effects the deaeration of the resin by subjecting the resin mixture to ultrasonic vibrations of 38,000 cycles per second. Successive batches of resin are subjected to these vibrations, each batch being thereafter drained into container 25. The batches of resin in the aggregate in container 25 comprise the quantity 16 of resin mixture. Burner 24 maintains the quantity 16 of resin mixture at a temperature of 160° C.

Current is passed to the internal resistance coils of mandrel 1 from alternating current source 28 through wires 21 and 20 and brushes 19 and 18 to the axles 3 and 2 of mandrel 1. The current continues and maintains the surface of the mandrel at a temperature of 50° C. during winding. Glass filaments 11, 12, 13, 14 and 15 are passed into quantity 16 of the resin and molybdenum disulfide particles. This coats the glass filaments with the aforesaid plastic resin and particles. Mandrel 1 is coated with any conventional release agent well-known in the art of filament winding. The mandrel is rotated at an angular velocity of slightly less than 57.3° per second. Glass filaments 11, 12, 13, 14 and 15 are passed from the quantity 16 of resin through the upright post 10 of guide assembly 26 at a speed of 2 inches per second. At guide assembly 26, the filaments are diverted from their previous linear course and are converged until they reach distributing arm 7. At distributing arm 7 the glass filaments 11, 12, 13, 14 and 15 are converged at upright fingers 6 still further to form a single band 34 of width B. Band 34 of glass filaments is helically wound at a pitch P no greater than bandwidth B, into a first layer 22 about the rotating mandrel 1. This first layer 22 is wound while distributing arm 7 is making a single axial pass along the mandrel in the direction indicated in FIG. 1. The various loops formed by the band 34 of glass filaments overlap slightly along mandrel 1. After first layer 22 has been completely wound about mandrel 1, the distributing arm 7 reverses axial direction and begins helical winding of subsequent layers about first layer 22. The helical winding may be of the same pitch P as first layer 22, or it may be at a greater or smaller pitch, though normally the subsequent layers will be wound at a pitch greater than pitch P. In any event, the winding operation is continuous and no time interval is necessary in order to cure the first layer 22. The subsequent layers of glass filaments are overwound about first layer 22 and all of the layers of the resin coated glass filaments are allowed to cure for about an hour to form a solid tube while mandrel 1 slowly rotates to prevent resin from draining. Thereafter, the tube produced is removed from mandrel 1 and is allowed to cure still further before put to use.

The following examples are further illustrative of the method of this invention:

EXAMPLE I

A polyester resin, produced by reacting 5.75 pounds of diethylene glycol, four pounds of maleic anhydride and 2 pounds of pthalic anhydride, is placed in a vat in an ultrasonic generator. Thereafter 3 pounds of styrene, 0.15 pounds benzyl peroxide, and 0.0036 pounds cobalt naphthanate are added to the resin mixture. The resulting mixture has a sufficiently low viscosity so that heating the resin mixture prior to filament winding is unnecessary. The ultrasonic generator is turned on and the vat is subjected to vibrations of 38,000 cycles per second. These ultrasonic vibrations act upon the polyester resin in the vat and work loose entrapped air and gas bubbles, thereby deaerating the plastic resin in the vat. A cylindrical steel mandrel is coated with a conventional resin release agent to prevent the coated glass filaments from adhering to the mandrel. Thereafter glass filaments are passed into the vat containing the polyester thermosetting plastic resin and are submerged in the resin, thereby becoming coated with resin while the ultrasonic vibration continues to deaerate the resin. The glass filaments are withdrawn from the vat and are wound about the cylindrical mandrel once the mandrel has begun to rotate. As the glass filaments are fed onto the mandrel, they are positioned in a flat band which forms adjacent loops as it is helically wound onto the mandrel. Helical winding on the mandrel is carried out at a pitch no greater than the bandwidth. The band of glass filaments is wound into a first layer about the rotating mandrel in a single axial pass along the mandrel. After the first inner layer of glass filaments is formed, subsequent layers of glass filaments are helically overwound about the first layer in a continuous filament winding operation. The resin used is of a low viscosity so that as the glass filaments are overwound onto the mandrel and about existing layers, the resin coating the glass filaments quickly spreads and thereby precludes the entrapment of air underneath the bands of glass filaments. A total of seven layers of glass filaments are overwound before winding is discontinued. The mandrel continues to rotate slowly for about 1 hour to prevent the resin from draining off. Thereafter the tube formed from the glass filaments and the mandrel are removed from the filament winding machine. The layers of resin coated glass filaments are allowed to cure still further for about 1 day at room temperature to fully cure and form a solid tube. The tube produced has an inner surface which has an extremely high-wear resistance and a low coefficient of friction, as compared with resin impregnated glass filament wound tubes formed in a conventional manner.

EXAMPLE II

Before the resin mixture is subjected to ultrasonic vibration, 1 pound of molybdenum disulfide is mixed into the polyester resin mixture. Thereafter the process of example I is repeated.

EXAMPLE III

Ten pounds of epoxy resin, produced by condensing epichlorohydrin and Bisphenol A, is introduced into a trough. 8.5 pounds of hexahydrophthalic anhydride and 0.2 pounds benzyl dimethylamine are thereafter introduced into the trough and are mixed with the epoxy resin therein. The trough is heated from beneath by a gas burner to a temperature of 50° C. The heating step is important for several reasons First of all it lowers the viscosity of the liquid contained in the trough. Secondly, heating mixed in the trough drives off any entrapped air from the resin, thereby continually deaerating the resin. Continued heating during winding keeps the resin at a low viscosity so as to prevent air from becoming entrapped during the filament winding operation. A chromium-steel cylindrical mandrel is rotated so that the velocity of the surface of the mandrel is 2.5 inches per second. A single conventional fiberglass filament is withdrawn from a spool or other filament source and is drawn through the uncured epoxy resin in the trough. The glass filament is passed through the resin at a speed of 2.5 inches per second. When the glass filament emerges from the resin it is helically wound onto the mandrel at a pitch equal to the filament diameter into a first filament wound layer about the rotating mandrel. The first layer is formed while the distributing arm of the filament winding machine makes a single axial path along the mandrel. The result is that the first resin impregnated fiberglass filament layer is formed from a series of loops of the fiberglass filament about the mandrel. The loops are adjacent to each other but do not crossover each other. The loops of the filament completely cover the surface of the mandrel so that there are no interstitial spaces between the adjacent loops of the glass filament through which the mandrel is exposed. During the filament winding process, the mandrel is heated by a quartz lamp from beneath to a temperature of 50° C. This heating keeps the resin on the resin coated glass filament in a less viscous state than would otherwise exist at room temperature. The heating also reduces the time required for curing. After the first glass filament wound layer is formed on the mandrel, the rotation of the mandrel is stopped and the movement of the distributing arm is stopped to allow adjustment of the speed of the distributing arm so that the helical winding pitch is increased. The angular velocity of rotation of the mandrel is increased, and the travel of the distributing arm is thereafter continued so that subsequent layers of loops of the glass filament are helically wound about the first layer of loops of the glass filament. The subsequent layers differ from the first layer in that in the subsequent layers, adjacent loops of the filament leave interstitial spaces therebetween and the filament crosses over existing loops in forming each of the subsequent layers. After ten layers of loops of the glass filament have been wound, the filament is cut and rotation of the mandrel is slowed to the speed just necessary to prevent resin from dripping from the mandrel. The layers of the loops of the glass filament are cured to a B-stage as the heat generated by the quartz lamp is increased to raise the temperature of the mandrel to about 100° C. The curing time is approximately 1 hour. After this, the mandrel is removed from the filament winding machine and the glass filaments are allowed to cure further, for approximately 2 hours at a temperature of about 150° C. Thereafter the tube formed by the cured resin impregnated glass filament layers is removed from the mandrel. This tube has an extremely high resistance to wear and a low coefficient of friction on its inner surface, as compared with filament wound tubes produced in a more conventional manner.

EXAMPLE IV

The method of example III is carried out with 8 pounds of the maleic anhydride adduct of methylcyclopentadiene being substituted for the hexahydrophthalic anhydride in the mixture of example III, and with 1 pound of graphite being mixed into the uncured resin prior to heating.

The foregoing detailed description and illustrations of the preferred methods of manufacture of the improved tube of this invention have been set forth for the purpose of providing clarity and understanding only, and no unnecessary limitations should be construed therefrom as further modifications will be obvious to those skilled in the art of glass filament winding.

We claim as our invention:

1. A method of forming a tube with an inner wall having high-wear resistance comprising the steps of:
   a. deaerating an uncured thermosetting plastic resin while present in bulk in a deaerating zone, said deaeration being effected by subjecting the aforesaid said bulk resin in said zone to ultrasonic vibrations of at least 20,000 cycles per second,
   b. coating glass filaments with said plastic resin,
   c. winding said glass filaments in a band at a pitch no greater than the bandwidth into a first layer about a rotating mandrel in a single axial pass along said mandrel, said winding of said filaments being at speed no greater than 3 inches per second,
   d. helically overwinding said glass filaments about said first layer in subsequent layers,
   e. curing said layers of said resin coated glass filaments to form a solid tube, and
   f. removing said tube from said mandrel.

2. The method of claim 1 further characterized in that particles of dry lubricant are mixed into said resin prior to aeration.

3. The method of claim 1 further characterized in that said mandrel is maintained at a temperature of at least 35° C. during winding.

4. The method of claim 3 further characterized in that said uncured resin is maintained at a temperature of at least 35° C. prior to winding.

* * * * *